United States Patent [19]

Thies

[11] Patent Number: 4,472,469

[45] Date of Patent: Sep. 18, 1984

[54] SEALING STRIP, MADE OF A THERMOPLASTIC MATERIAL CONTAINING A METALLIC REINFORCING INSERT

[75] Inventor: Georg Thies, Barsbüttel-Willinghusen, Fed. Rep. of Germany

[73] Assignee: Schlegel GmbH, Hamburg, Fed. Rep. of Germany

[21] Appl. No.: 466,727

[22] Filed: Feb. 15, 1983

[30] Foreign Application Priority Data

Feb. 18, 1982 [DE] Fed. Rep. of Germany ....... 3205743

[51] Int. Cl.$^3$ ............................................. E06B 7/23
[52] U.S. Cl. .................................... 428/122; 428/192; 428/217; 49/490; 49/496; 52/716
[58] Field of Search ................... 428/31, 83, 122, 217; 49/488, 490, 497, 496, 498, 491; 52/716

[56] References Cited

U.S. PATENT DOCUMENTS 3,788,008  1/1974  Yackiw et al. ..................... 49/496
4,010,573  3/1977  Andrzejewski ................ 428/122 X Primary Examiner—Alexander Thomas
Attorney, Agent, or Firm—Cumpston & Shaw

[57] ABSTRACT

A sealing strip is composed of a holding part and a sealing part, the holding part being relatively resistant to bending and the sealing part being relatively flexible. It is made of a yielding, thermoplastic material containing a metallic reinforcing insert. The holding part (1) and the sealing part (2) contain separate, metallic reinforcing inserts. These inserts are interconnected in a manner permitting forces to be transmitted, by arranging for them to be jointly encased, by the thermoplastic material, in a connecting part (4) which can form a portion of the holding part (1). This is achieved by means of a process wherein the two metallic inserts are encased, with portions of their cross-sections located adjacent to one another, for example on passing through an extrusion die.

11 Claims, 5 Drawing Figures

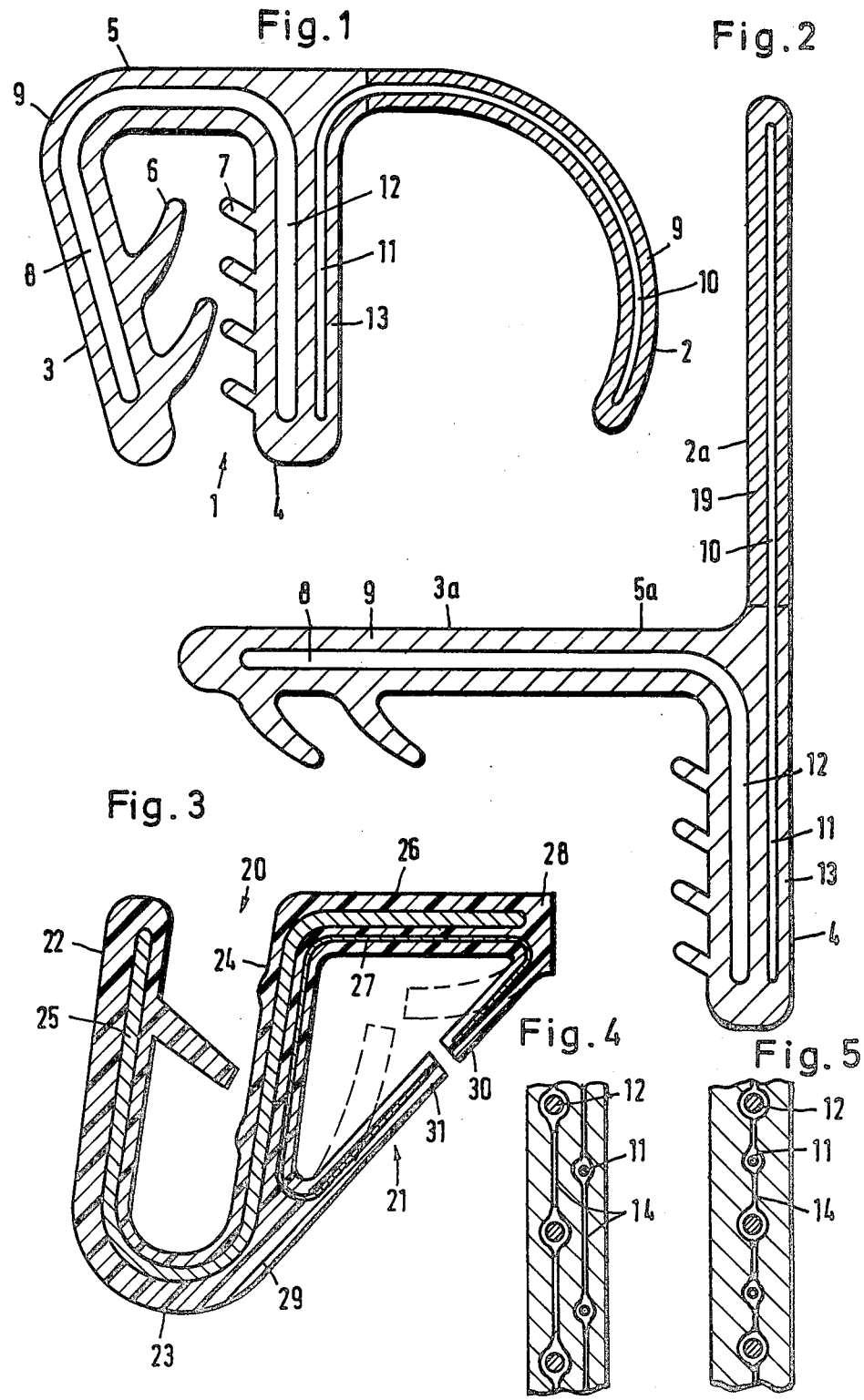

SEALING STRIP, MADE OF A THERMOPLASTIC MATERIAL CONTAINING A METALLIC REINFORCING INSERT

DESCRIPTION

The invention relates to a sealing strip which, in cross-section, is composed of a holding part and a sealing part, the holding part being relatively resistant to bending and the sealing part being relatively flexible, which parts are securely interconnected in order to transmit the sealing forces from the sealing part to the holding part, and are made of a thermoplastic material containing a metallic reinforcing insert.

The invention relates, in particular, to sealing strips of the type in which the holding part must exhibit high dimensional stability and a high holding strength, while the sealing part is soft and exhibits complete elasticity even after a comparatively long period of use. An example of a sealing strip of this type is provided by the motor vehicle door seals shown in U.S. Pat. No. 4,010,573, which are composed of a holding part possessing a cross-section in the shape of a "U", made of a thermoplastic material containing a metallic reinforcing insert, and of a sealing part, made of rubber, which is attached to the holding part by means of an adhesive. Thermoplastic materials have proved unsatisfactory in applications involving sealing parts of a permanently resilient nature, because these materials cease to exhibit their full elastic springback force after a comparatively long period of use. However, rubber materials are intrinsically more expensive than thermoplastic materials, and are also more expensive to mould. Moreover, attaching them to the thermoplastic material of the holding part is an additional and expensive operation. Although this can, admittedly, be avoided by using the rubber material for the holding part as well, instead of the thermoplastic material, and by extruding the holding part and the sealing part in one operation, it is, however, generally more expedient, with regard to the service characteristics and to the material costs, to use thermoplastic material in the holding part and rubber in the sealing part.

U.S. Pat. No. 3,788,008 discloses that permanent resilience in a sealing lip composed of a thermoplastic material can be assured by means of a resilient metal insert. In this arrangement, the metal insert is the same as that which is also provided in the holding part of the sealing strip. Since, however, the elasticity of this insert is adjusted to the desired, soft characteristics of the sealing lip, it is incapable, in many cases, of imparting adequate stiffness to the holding portion. This arrangement is consequently unsuitable for motor vehicle door seals and similar applications.

The object underlying the invention is accordingly to provide a sealing strip, of the type initially mentioned, which permits considerable differences in the mechanical characteristics of the holding part and of the sealing part and, despite these differences, permits the sealing part to be adequately resilient, without using rubber material.

The solution according to the invention takes the form of an arrangement wherein the sealing part contains a relatively flexible reinforcing insert which is separate from the reinforcing insert in the holding part, and is connected to this insert in a manner permitting forces to be transmitted, and wherein portions of the two reinforcing inserts inside a connecting part are spaced a short distance apart and are encased by the thermoplastic material.

The invention permits the selection, for the holding part and for the sealing part, of metallic inserts with dissimilar mechanical characteristics, and thereby makes it possible to adjust the mechanical characteristics of the holding part, and of the sealing part, in any desired manner—while at the same time taking account of the particular mechanical properties of the thermoplastic material which is employed in the two parts. In doing so, it is unnecessary to go to great expense in order to produce the secure connection between the two inserts which transmit the forces from the sealing part to the holding part, because this connection results automatically when sufficiently large parts of these inserts, spaced a short distance apart, are jointly encased, by the thermoplastic, over a certain length. The manufacturing process is simple, because two inserts are now led, with the thermoplastic material to be moulded, through an extrusion die, instead of the single insert customary hitherto, the technique being identical.

Although it is known, per se, to arrange two reinforcing inserts inside one and the same profile section part, this part being composed of a polymeric material (German Offenlegungsschrift No. 2,818,225), the two reinforcing inserts do not, however, at the same time possess dissimilar mechanical characteristics and, moreover, they do not need to be rigidly interconnected in order to transmit sealing forces.

It is also known (French Pat. No. 1,467,128), in a plastic profile section for connecting the edges of two adjacent panels, to provide two holding parts, each of which contains a metallic reinforcing insert, but these inserts are widely spaced, inside the plastic profile section, so that it is impossible to expect that forces could be transmitted between them without deformation, as is necessary in the case where sealing forces are transmitted from a sealing part to the associated holding part.

In the sense of the invention, the term "sealing strip" is to be understood as meaning a profile section strip which, in general, possesses a cross-sectional configuration which is constant over its length. The shape of the holding part can vary, but it is implied that these holding parts are predominantly of types which are capable of absorbing considerable bending moments about an axis which is parallel to the longitudinal direction of the strip. The term "sealing forces" is to be understood as meaning, primarily, those forces which act in a cross-sectional plane of the sealing strip. At the same time, it is presumed that all the forces are, for the most part, absorbed by the metallic insert, and that they must be transmitted, from insert to insert, without any significant dimensional changes within the connecting part.

The transmission of forces from the reinforcing insert in the sealing part to the reinforcing insert in the holding part, essentially without deformation, is most effectively assured when those portions of the inserts which are inside the connecting part are located adjacent to one another, with the smallest possible spacing, and over the greatest possible length. In any case, the average spacing of the inserts in the connecting part should be less than one third of the length of the connecting part. Furthermore, the average spacing of the inserts should not, if possible, exceed approximately three times the thickness of whichever reinforcing insert is the thicker. It is also expedient if, inside the connecting part, the reinforcing inserts run essentially parallel to one another. Although it is possible, within the scope of the invention, for the holding part and the sealing part to be composed of materials possessing different hardnesses, this does not exclude the possibility, however, according to which these two parts are formed from the thermoplastic material in one piece, in which material the regions of different hardness are welded together and, at the same time, shaped by means of a co-extrusion process. This technique of simultaneously extruding essentially identical materials, which possess dissimilar hardnesses but are, in any case, capable of being welded together, is known.

The connecting part, or at least a portion thereof, expediently forms a portion of the holding part. This is expedient, because the connecting part generally possesses a particularly high resistance to bending, due to the fact that it is doubly reinforced with reinforcing inserts. If the holding part is configured with a cross-section in the shape of a "U", one of the two limbs of the holding part can be used as the connecting part. Alternatively, it is also possible to design the web between the two limbs as a connecting part.

The abovementioned, particularly high resistance to bending of the connecting part can be utilised, structurally, when there is a need to provide a part, between the holding and sealing parts, or as a portion of one of these parts, which should possess particularly high resistance to bending. While the connecting part is otherwise dimensioned only as required with regard to the necessary connection strength, it can, in this case, be extended, and can possess a shape which, departing from the connecting function, is defined by the structural function of the particular part which possesses a high resistance to bending.

As reinforcing inserts, known reinforcing inserts, of the type formed by a metal wire, bent into a zigzag shape, are particularly suitable in relation to the invention. In particular, these inserts are easier to anchor, a short distance apart, and with a higher connection strength, in the material of the connecting part, than known reinforcing inserts which are punched from metal sheet, and which could admittedly also be used, in principle, but around which the connecting material would not, in some cases, flow in a sufficiently uniform manner, on account of their extended parallel surfaces, and which would not then be bound to one another sufficiently strongly. This applies, in particular, when they happen to be arranged, inside the connecting part, in a manner such that they touch one another, or are spaced only a short distance apart and portions, without perforations, of one of the inserts cover, in each case, the areas of the other insert, located opposite to them, which have been punched out. Although, in general, it is unnecessary to interconnect the inserts, in their connection region, by means other than the thermoplastic material of the connecting part, arrangements can, however, be made, if the inserts are of the type composed of a bent wire, the turns of which are interconnected by flexible strands before being encased by the thermoplastic material, whereby the flexible strands, in the connection region, not only interconnect the adjacent turns of one particular insert, but interconnect the two inserts. This can, in fact, sometimes be effected without additional expense, by a process wherein the two inserts are bent, and provided with flexible strands, in one machine, or in combined machines. In most cases, connecting the two inserts by means of the flexible strands results in no appreciable improvement in their connecting strengths inside the connecting part, because the strength of the sheathing material predominates over that of the flexible strands. HoweVer, the prior connection of the two inserts can simplify the operation of guiding them through the extrusion die, and increase the reliability with regard to the accurate mutual positioning of the inserts, spaced a short distance apart.

In the text which follows, the invention is explained in more detail, by reference to the drawing, which illustrates advantageous illustrative embodiments, and in which:

FIG. 1 shows the cross-sectional configuration of a first embodiment,

FIG. 2 shows the sealing strip according to FIG. 1, in the shape in which it is extruded, FIG. 3 shows a second embodiment, FIG. 4 shows a longitudinal section through a first embodiment of a connecting part, and FIG. 5 shows a cross-section through a second embodiment of a connecting part.

The sealing strip according to FIG. 1 is composed of a holding part 1, and of the sealing part, the latter being designed as a lip 2. The holding part 1 is composed of two limbs, 3 and 4, which are interconnected by a web 5. On the inner surfaces, the limbs 3, 4 possess holding ribs 6, 7, these ribs serving to improve the grip on a vehicle bodywork flange, onto which the holding part 1 is to be pushed. The holding part is endowed with the necessary gripping strength by means of a metallic reinforcing insert 8 which is composed, for example, of a steel wire, bent into a zigzag shape, and which passes through the two limbs 3, 4, and through the web 5, adjacent turns of this wire being interconnected by flexible textile threads and thereby being secured, in the condition prior to being encased, in their relative positions, as shown in U.S. Pat. No. 3,198,689. The insert is encased, with the profile section indicated in the drawing, by a thermoplastic material, such as, for example, polyvinyl chloride, the hardness of which is adjusted to the level customary for profile sections used for protecting edges on motor vehicles.

The sealing lip 2 departs from the holding part 1 in the region of the transition-between the limb 4 and the web 5. It is composed of essentially the same material, but its hardness is adjusted to a somewhat lower value. The difference is indicated by denser shading. The thermoplastic material forming the holding part 1 and the sealing lip 2 is co-extruded, by a known technique, the two grades of material being securely welded to one another in the transition region.

The sealing lip 2 contains a reinforcing insert 10, composed of spring steel wire, bent into a zigzag shape, this wire being thinner than that of the reinforcing insert 8. The strength of the reinforcing insert 10 and the thickness of thermoplastic material surrounding it are chosen, by design, such that the desired sealing force and compliance results when the sealing lip is deformed by the expected amount.

The portion 11 of the reinforcing insert 10, inside the limb 4 of the holding part 1, runs parallel and closely adjacent to the portion 12 of the reinforcing insert 8 of the holding part. Consequently, the portions 11 and 12 of the two reinforcing inserts are jointly encased by the thermoplastic material 13 of the limb 4, so that this material can assume the function of transmitting the force acting on the sealing lip 2 to the portion 12 of the reinforcing insert 8, via the portion 11 of the reinforcing insert 10. In this manner, the limb 4 forms the connecting part for the reinforcing inserts.

The operation of sheathing the reinforcing inserts 8, 10 is carried out by a known extrusion process, in which the reinforcing inserts, formed as effectively endless strips, are led through the extrusion die, to which the thermoplastic material, 9, 13, is also fed. In the moulding process, in the extrusion die, the arrangement does not yet need to have its final cross-sectional configuration according to FIG. 1. It is generally preferred to carry out the extrusion operation to as simple a cross-sectional configuration as possible, and only afterwards to bend the holding part and the sealing part. This is explained by reference to FIG. 2.

There, the sealing strip, with the cross-section according to FIG. 1, can be seen in the configuration which it possesses immediately after the extrusion operation. That portion 2a of the cross-section which is later to form the sealing lip 2 is in line with those portions, 3a, 5a, of the cross-section which are later to form the limb 3 and the web 5 of the holding part. These portions are later bent in a manner such that the cross-sectional shape represented in FIG. 1 results. The chosen extrusion profile is such that the reinforcing insert 10 can be led through the extrusion die, in its flat form, while the reinforcing insert 8 has previously been profiled to an angle section. Alternatively, the converse arrangement is, of course, also possible, whereby the reinforcing insert 8 is flat and the reinforcing insert 10 is profiled, in a preliminary operation, to an angle section, or completely different angle configurations may be chosen. It can be seen, in addition, that the reinforcing insert 10 in the sealing lip 2 could, for example, also be anchored in the web 5, beside the insert 8 in the holding part, instead of in the limb 4.

In FIGS. 1 and 2, the portions 11 and 12 of the reinforcing inserts are arranged inside the limb 4, spaced a certain distance apart, the intervening space being filled by the thermoplastic material. However, this space is small in comparison with the length, measured in the cross-section of the connecting part, being, in fact, less than a tenth of this length. At the same time, the picture shown in FIG. 4 results, in a cross-section through the holding part, drawn in the longitudinal direction of the sealing strip, in which picture the individual wires, 12 and 11, of the inserts can be seen, these wires being interconnected—in each case separately—by threads 14.

It is possible, not only to arrange the inserts, inside the connecting part, with a smaller spacing than in FIG. 4, but they can also be incorporated with virtually no spacing when those portions of the inserts which are subsequently to be jointly encased by the connecting parts are interwoven by means of the textile threads, or by other strands which may be used for the temporary connection of the wires. The picture according to FIG. 5 then results.

The illustrative embodiment according to FIG. 3 comprises a holding part 20 and a sealing part 21. The holding part is constructed, in a cross-section having the shape of a "U", from a limb 22, a web 23, and a limb 24, and contains a reinforcing insert 25, of steel wire, as has been explained in the case of the preceding Example. It is also designed for attachment to a flange of a motor vehicle body. An arm 26 is contiguous with the free end of the limb 24, approximately at rightangles, into which arm the reinforcing insert 25 is continued, in one piece. The thickness of the thermoplastic material of the arm 26 is approximately equal to that of the limbs 22, 24, and of the web 23.

A second reinforcing insert 27, composed of thinner spring steel wire, is arranged in the limb 24, and in the arm 26, parallel to the reinforcing insert 25. In a section through these portions, drawn in the longitudinal direction of the strip, the arrangement can be imagined as conforming to that indicated in FIG. 4. Since the reinforcing inserts 25, 27 are spaced apart, the limb 24 and the arm 26 possess an unusually high resistance to bending, due to the fact that the resistance of a component to bending is proportional to the third power of the centre-to-centre distance of its portions which are furthest removed from the centre of the bend. Due to the high modulus of elasticity of steel, compared to plastic, this consideration, in the present case, relates virtually only to the reinforcing inserts. As a result of the spatial separation of the two reinforcing inserts, the abovementioned maximum centre-to-centre distance is considerably greater in the limb 24, and in the arm 26, than in the remaining portions of the holding part. The unusually high resistance of the limb 24, and of the arm 26, to bending, is thus attributable to the forces and moments acting in the cross-sectional plane. It can be seen that, in the case of the connection, according to the invention, of two reinforcing inserts inside a plastic profile section, this principle allows a large amount of design freedom in the production of cross-sectional portions possessing different resistances to bending.

Lips 30, 31 are contiguous with the free end 28 of the arm 26, and with the transition region 29 between the web 23 and the limb 24. These lips 30, 31 converge obliquely, contain the reinforcing insert 27, and are designed to be considerably thinner, in the cross-section of the thermoplastic material, than the remaining portions of the profile section strip. They are accordingly considerably softer, and more flexible, than the remaining portions of the profile section strip, the elastic characteristics of the spring steel insert 27 endowing them with permanently resilient characteristics, which the plastic material does not otherwise possess. For example, under the action of an opposing sealing surface, which is not shown, they can deform in the manner indicated by the broken lines in FIG. 3.

In the illustrative embodiment according to FIG. 3, it is arranged that the thermoplastic material in the holding part 20 is identical to that in the sealing part 21, and has also been adjusted to the same hardness level. However, it is also possible, in this case, exactly as in the illustrative embodiment according to FIG. 1, for different hardness levels to be provided.

I claim:

1. Sealing strip which, in cross-section, is composed of a holding part (1, 20) and a sealing part (2, 21), the holding part being relatively resistant to bending and the sealing part being more flexible than the holding part, which parts are securely interconnected in order to transmit the sealing forces from the sealing part to the holding part, and are made of a thermoplastic material (9, 13, 19) containing a metallic reinforcing insert (8), characterised in that the sealing part (2, 21) contains a reinforcing insert (10, 27) which is separate from and more flexible than the reinforcing insert (8, 25) in the holding part (1, 20), and is connected to this insert in a manner permitting forces to be transmitted, and in that portions (11, 12) of the two reinforcing inserts (8, 10, 25, 27) inside a connecting part (4, 24, 26) are spaced a short distance apart and are encased by the thermoplastic material (13).

2. Sealing strip according to claim 1, characterised in that the average spacing of the reinforcing inserts in the connecting part (4,24,26) is less than one third of the length of the connecting part.

3. Sealing strip according to claim 2, characterised in that, inside the connecting part (4,24,26), the reinforcing inserts (11,12,25,27,) run essentially parallel to one another.

4. Sealing strip according to claim 1 characterised in the holding part (1,20) and the sealing part (2,21) are moulded from a thermoplastic material in one piece.

5. Sealing strip according to claim 4, characterised in that the holding part (1) and the sealing part (2) incorporate material (9,19) of dissimilar hardness.

6. Sealing strip according to claim 1 characterised in that at least a portion (24) of the connecting part (24,26) forms a portion (24) of the holding part (20).

7. Sealing strip according to claim 6, characterised in that the holding part (1,20) is configured with a cross-section in the shape of a "U", and the connecting part (4,24) is formed, at least partially, by a limb of the holding part.

8. Sealing strip according to claim 6, characterised in that the holding part (1,20) is configured with a cross-section in the shape of a "U", and the connecting part is formed, at least partially, by the web (5) of the holding part.

9. Sealing strip according to claim 1 characterised in that it possesses a part (24,26) which is particularly highly resistant to bending, this part being located between the holding part (20) and the sealing part (21), or being a portion (24) of one of these parts, this part (24,26) being designed as a connecting part.

10. Sealing strip according to claim 1 characterised in that the reinforcing inserts (8,10,25, 27) are formed by a metal wire which is bent into a zigzag shape, adjacent loops of this wire being interconnected by flexible strands (14).

11. Sealing strip according to claim 10, characterised in that the inserts in the connecting part are interconnected by flexible strands.

* * * * *